May 24, 1960   L. W. HUSSEY   2,938,167
TRANSISTOR TEST SET
Filed June 27, 1955
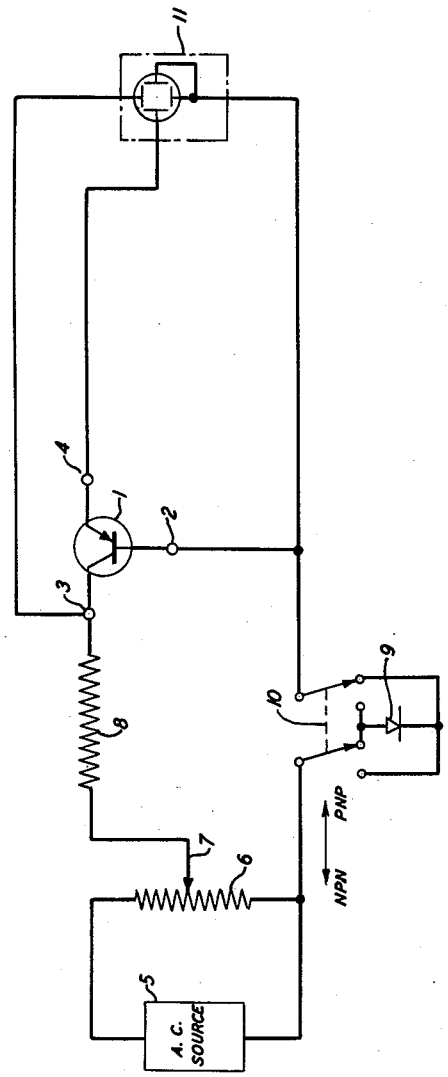
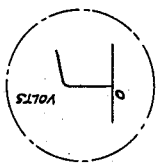
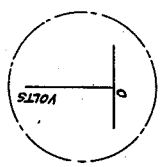
INVENTOR
*L.W. HUSSEY*
BY
*Walter M. Hill*
ATTORNEY

United States Patent Office 2,938,167
Patented May 24, 1960

2,938,167
TRANSISTOR TEST SET

Luther W. Hussey, Sparta, N.J., assignor to Bell Telephone Laboratories, Incorporated, New York, N.Y., a corporation of New York Filed June 27, 1955, Ser. No. 518,031

5 Claims. (Cl. 324—158)

This invention relates to the art of electrical measurements and more particularly to a test set for measuring the "punch-through voltage" of a transistor.

By the term "punch-through voltage" is meant that voltage applied in the reverse direction between the base and one of the electrodes of a transistor which will develop an electromotive force in a third, unbiased electrode. A transistor which develops such an electromotive force for applied voltages within the normal signal voltage range is considered unsatisfactory. For test purposes, the applied voltage is preferably brought to the break-down value and if no punch-through electromotive force is observed the transistor is regarded as satisfactory.

It is the object of this invention to provide a test set for determining the punch-through voltage of transistors.

The foregoing object is achieved by this invention which provides an apparatus for gradually increasing the reverse voltage between the base and one of the other electrodes of a transistor. The impressed voltage appearing across these two electrodes is applied to one axis of a conventional oscilloscope while any voltage which may develop between the base and a third electrode of the transistor is applied to the other oscilloscope axis. The oscillogram will depart from a straight line at the voltage where the punch-through phenomenon takes place.

The invention may be better understood by referring to the accompanying drawings in which:

Fig. 1 is a circuit diagram disclosing the essential features of a preferred embodiment of this invention;

Fig. 2 discloses an oscillogram of a satisfactory transistor; and

Fig. 3 shows an oscillogram of a transistor defective to the extent that a punch-through voltage is evidenced by a sharp departure from a straight line.

Referring now to Fig. 1, a transistor 1 is shown connected to test terminals 2, 3 and 4. Test terminal 2 is connected to the base of the transistor. As shown in Fig. 1, the collector is connected to test terminal 3 while the emitter is connected to test terminal 4. These connections are for determining the punch-through effect from the collector to the emitter. If desired, the collector and emitter electrodes may be reversed in their connections to test terminals 3 and 4 in order to determine the punch-through effect from the emitter to the collector.

An alternating-current source 5 of sufficient amplitude to exceed the break-down voltage of the transistor to be tested is connected to a voltage regulating potentiometer 6 having a regulating slider 7. The output voltage of this potentiometer is applied to test terminals 2 and 3 through a relatively high resistance 8 and preferably also through an asymmetric conductive device 9. The resistance of resistor 8 is large enough to limit the break-down current below a destructive level for the transistor under test. The asymmetric conductor 9 is preferably a commercially available silicon diode and serves to prevent the flow of forward current through the transistor between terminals 2 and 3.

The transistor 1 shown in Fig. 1 symbolically represents a transistor of the PNP type and the reversing switch 10, which is connected to diode 9, is in the position for testing this type of transistor. It will be noted that by reversing the diode connections, voltage is readily supplied to test terminals 2 and 3 in the reverse direction. For the PNP type, the reverse direction requires that the collector be negative with respect to the base. Forward current, which would normally flow on reversal of the alternating-current source, will be blocked by the diode 9. If the transistor under test is of the NPN type, switch 10 is moved to the left to reverse the polarity of diode 9 thereby again preventing the flow of forward current. The impressed voltage appearing across test terminals 2 and 3 is applied to the vertical deflection electrodes of a conventional oscilloscope 11. Test terminals 4 and 2 are connected to the horizontal deflection electrodes of the oscilloscope.

It should be especially noted that no biasing voltage is applied to the electrode connected to test terminal 4. A transistor, which is not defective from the punch-through standpoint, will develop no electromotive force in the electrode connected to terminal 4 while the voltage is raised in the reverse direction between test terminals 2 and 3 up to the break-down point. The resulting oscillogram of a satisfactory transistor is shown in Fig. 2.

In Fig. 2 the trace is shown rising vertically from the horizontal axis and terminating at a voltage corresponding to the break-down voltage of the transistor. As a specific example, assume that the PNP type, three-electrode transistor, symbolically represented in Fig. 1, is under test. The slider 7 is gradually raised until the reverse voltage appearing across terminals 2 and 3 ceases to rise. This is the collector to base breakdown voltage which will be evidenced by the fact that the vertical trace on the oscilloscope screen ceases to increase in height. So long as no punch-through voltage has developed, the oscillogram will appear as shown in Fig. 2. Should a punch-through voltage develop before the break-down voltage is reached, an electromotive force is developed in the emitter electrode connected to test terminal 4. This will cause a rapid horizontal deflection of the beam to produce a trace exemplified by that shown in Fig. 3.

Calibration of the horizontal axis of the oscilloscope is immaterial. However, it is desirable to calibrate the vertical axis by any laboratory means well known in the art. Thus the break-down voltage of a good transistor may be read on the vertical scale along the vertical axis where the trace terminates as shown in Fig. 2. Likewise the punch-through voltage may be determined by observing the vertical scale at the point where the trace suddenly departs, in a substantially horizontal direction, from a straight line.

In illustrating the invention, reference has been made only to transistors having three electrodes. However, the punch-through voltage of transistors having more than three electrodes may be readily measured by the apparatus of this invention. It is only required that the base electrode be connected to test terminal 2 and that another electrode, to which signal voltage is to be applied, be connected to terminal 3. A third electrode, which may be any of the remaining electrodes of the transistor, is connected to test terminal 4. The punch-through effect occurring from the electrode connected to test terminal 3 to the electrode connected to test terminal 4 is thereby measured.

What is claimed is:

1. Apparatus for determining the punch-through voltage of a transistor having a base and at least two other electrodes comprising a circuit means including an impedance for applying a gradually increasing voltage in the reverse direction between the base and one of the other electrodes, an oscilloscope having vertical and horizontal deflecting means, and means for connecting one of said deflecting means across the two electrodes receiving said voltage and the other deflecting means between the base and a third electrode.

2. Apparatus for determining the punch-through voltage of a transistor having a base and at least two other electrodes comprising a source of alternating voltage, means including a serially connected resistor for connecting said source across the base electrode and a second electrode of said transistor, an oscilloscope having vertical and horizontal deflecting means, circuit means for coupling the base and said second electrode to one of said deflecting means, and other circuit means for coupling the base and a third electrode to the other deflecting means.

3. Apparatus for determining the punch-through voltage of a transistor having a base and at least two other electrodes, comprising a source of alternating voltage, means including a resistor in series with an asymmetrical conductive device for connecting said source across the base electrode and a second electrode of said transistor, an oscilloscope having vertical and horizontal deflecting means, circuit means for coupling the base and said second electrode to one of said deflecting means, and other circuit means for coupling the base and a third electrode to the other deflecting means.

4. The combination of claim 3 and a reversing switch connected to reverse the polarity of said asymmetric device whereby the apparatus may be adapted for measurements of either NPN or PNP type transistors.

5. Apparatus for determining the punch-through voltage of a transistor having a base and at least two other unbiased electrodes, comprising a circuit means including an impedance for applying a gradually increasing voltage in the reverse direction between the base and one of said other electrodes, and means for detecting an electromotive force which may develop between the base and another unbiased electrode.

References Cited in the file of this patent

UNITED STATES PATENTS 2,736,860    Trousdale _____ Feb. 28, 1956

OTHER REFERENCES

Hunter et al.: "Electronics," October, 1950, pages 96–99. (Copy in Scientific Library and in Division 48.)

Jochems et al.: "Philips Technical Review," vol. 13, No. 9, March, 1952, pages 254–265. (Copy in Div. 48.)

Schenkel et al.: "National Electronics Conference," vol. 10, 1954, pages 614–625. (Copy in Scientific Library and in Division 48.)